US007104885B2

(12) United States Patent
Reimer

(10) Patent No.: US 7,104,885 B2
(45) Date of Patent: Sep. 12, 2006

(54) SYSTEMS AND METHODS WHEREIN A RECONFIGURATION RULE IS NOT INDICATED DURING AT LEAST A PORTION OF GAME PLAY

(75) Inventor: Harry A. Reimer, Richmond Hill, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/818,882

(22) Filed: Mar. 27, 2001

(65) Prior Publication Data

US 2002/0142819 A1 Oct. 3, 2002

(51) Int. Cl.
*A63F 13/00* (2006.01)

(52) U.S. Cl. .............................................. 463/9; 463/1

(58) Field of Classification Search ............ 273/153 R, 273/153 S, 157 R, 271; 463/9, 10, 31, 33, 463/1

See application file for complete search history.

(56) References Cited

U.S. PATENT DOCUMENTS 4,248,422 A * 2/1981 Messina ..................... 273/441
5,265,888 A * 11/1993 Yamamoto et al. ........... 463/10
5,423,556 A * 6/1995 Latypov ........................ 463/9
RE36,675 E * 4/2000 Yamamoto et al. ........... 463/10
6,273,420 B1 * 8/2001 Brooks ................... 273/153 R
6,332,838 B1 * 12/2001 Yamagami ..................... 463/9
6,352,475 B1 * 3/2002 Mraovic ........................ 463/9
6,398,641 B1 * 6/2002 Yamagami et al. ............ 463/9
6,488,580 B1 * 12/2002 Robb .......................... 463/23

OTHER PUBLICATIONS

Kilby et al.: Casino Operations Management, 1998, John Wiley & Sons, Inc., p. 198.*
Brown, Peter: Inside Pachinko: Skill or Pure Luck, 1996, http://www.asij.ac.jp/highschool/journalism/pachinko.html.*
Amiga Freeware, SameGame, 2000, http://www.amiga-stuff.com/samegame/main.html.*
Boulding, Aaron: The New Tetris, Aug. 1999, IGN.com, http://ign64.ign.com/articles/160/160072p1.html.*
Tetris Attack, Intro and How to Play, circa 1996, http://www.tetrisattack.net, see entire document.*
Begin, Steve, Tetris Attack Manual, circa 1996, http://www.world-of-nintendo.com/manual/super_nes/tetris_attack.shtml, see entire document.*
Archive.org, MSN Games from Oct. 2000, http://web.archive.org/web/20001019004922/http://games.msn.com/.*
Nago, Kirby's Star Stacker Manual, circa 1997, http://kirbybox.zophar.net/games/kstars_manual.htm.*

(Continued)

*Primary Examiner*—Xuan M. Thai
*Assistant Examiner*—Alex Epshteyn
(74) *Attorney, Agent, or Firm*—Carson C. K. Fincham

(57) ABSTRACT

Systems and methods are provided wherein a reconfiguration rule is not indicated to a player during at least a portion of game play. According to one embodiment, a game board having a plurality of game icons is displayed to a player, and it is arranged for the player to make a series of game moves. In particular, each game move comprises: (i) receiving a player input, (ii) removing at least one game icon from the game board based on the player input, and (iii) reconfiguring the game board according to one of a plurality of reconfiguration rules. Moreover, a reconfiguration rule to be applied during a game move is not indicated to the player during at least a portion of the game play.

15 Claims, 14 Drawing Sheets

OTHER PUBLICATIONS

Archive.org, Uproar.com from Dec. 2000, http://web.archive.org/web/20001019066l4/m-findex/asp.*
Uproar: Net Entertainment, May 1999, see enclosed document.*
IGN.com, Pokemon Puzzle League, Sep. 25, 2000, http://ign64.ign.com/objects/014/014801.html?fromint=1.*
IGN.com, Tetris Attack, Sep. 1, 1996, http://ign64.ign.com/objects/014.014801.html?ui=gamefinder.*
Tetris Attack, Intro and How to Play, circa 1996, http://www.tetrisattack.net.*
Begin, Steve, Tetris Attack Manual, circa 1996, http://www.wold-of-niinetendo.com/manual/super_nes/tetris_attack.shtml.*
Acrchive.org, MSN Games from Oct. 2000, http://web.archive.org/web/20001019004922/http://games.msn.comAr.*
Archiveorg, Uproar.com from Dec. 2000, http://web.archive.org/web/2000101906614/m-findex/asp.*
Uproar: Net Entertainment, May 1999.*
Tile Fall, adamdawes.com, Nov. 5, 2000. http://www.adamdawes.com/windows/win_tilefall.html.*
Symbolic Link, MSN Zone, 2001.
Event Horizon, Game Scene, 2001.
Hexis, 1999.
Balltris Help, 2001.
Oscar Sundbom, README for Black-Hole v1.0, 2001.
Poppit! Rules, Pogo, 2001.

* cited by examiner

500

| GAME IDENTIFIER 502 | PLAYER IDENTIFIER 504 | NEXT RECONFIGURATION RULES 506 | CURRENT SCORE 508 |
|---|---|---|---|
| G1001 | P1001 | →, ↓ | 760 |

FIG. 5

700

| PLAYER IDENTIFIER 702 | NAME 704 | CONTACT INFORMATION 706 | PAYMENT IDENTIFIER 708 | ACCOUNT BALANCE 710 |
|---|---|---|---|---|
| P1001 | JENNIFER JAMES | 32 GARDEN RD. NEWTOWN, USA | 1234-1234-1234-1234 (CREDIT CARD) | +$20.00 |
| P1002 | MICHAEL SMITH | MSMITH@ISP.COM | 1111-2222-3333-4444 (DEBIT CARD) | - $10.00 |
| P1003 | DAVID STONE | (718) 555-1111 | ABC@PAY.COM | 0 |
| P1004 | SUSAN WHITE | (212) 555 1234 | 1212-1212-1212-1212 (CREDIT CARD) | - $0.10 |
| P1005 | KEVIN DOWNS | 1234.5678.1234.5678 | 123456789 (BANK ACCOUNT) | + $1,000.00 |

FIG. 7

800

| GAME IDENTIFIER 802 | PLAYER IDENTIFIER 804 | INDICATED RECONFIGURATION RULES 806 | NON-INDICATED RECONFIGURATION RULES 808 |
|---|---|---|---|
| G1001 | P1001 | →, ↓ | ←,←, ↑, →, ←, ↑, →, ↓, . . . |
| G1002 | P1002 | ↑, ↑ | ←, ←, ↑, →, ↓, ↑, →, ↓, . . . |
| G2001 | P1006 | ←, → | ↑,←, ↓, ↓, ↑, →, ↓, . . . |
| G3001 | P1001 | CLOCKWISE | COUNTERCLOCKWISE, CLOCKWISE, . . . |

FIG. 8

900

| RECONFIGURATION RULE IDENTIFIER 902 | DESCRIPTION 904 |
|---|---|
| ↓ | SHIFT GAME ICONS DOWN |
| ↑ | SHIFT GAME ICONS UP |
| ← | SHIFT GAME ICONS TO THE LEFT |
| → | SHIFT GAME ICONS TO THE RIGHT |

FIG. 9

SYSTEMS AND METHODS WHEREIN A RECONFIGURATION RULE IS NOT INDICATED DURING AT LEAST A PORTION OF GAME PLAY

FIELD

The present invention relates to games. In particular, the present invention relates to systems and methods wherein a reconfiguration rule is not indicated to a player during at least a portion of game play.

BACKGROUND

Many players enjoy playing computer-based games, such as puzzle games and/or fast paced arcade-style games (e.g., games in which a player uses skill, such as his or her planning and reflexes, to achieve a goal). In one type of computer-based puzzle game, for example, an array of colored balloons are displayed to a player. The player then provides a player input to select one or more of the balloons. Generally, the player uses a keyboard and/or a computer mouse to generate such an input. In some games, a player is only allowed to select a balloon if it neighbors at least one other balloon of the same color.

The selected balloon is removed from the display along with any neighboring balloons of the same color. In some games, the player scores points based on how many balloons are removed from the display (e.g., based on the length of the "chain" of neighboring balloons of the same color). The remaining balloons are then reconfigured, such as by having the balloons float up and to the left to fill-in any holes created when balloons were removed. Note that this reconfiguration may cause new patterns to emerge in the puzzle (e.g., a balloon may be moved such that it now neighbors a balloon of the same color). The player repeats this process until, for example, no more balloons can be removed, all of the balloons have been removed, a predetermined number of moves have been made, and/or a predetermined period of time expires.

One way a player can play a game, such as the puzzle game described above, is via a player device. For example, the player may use his or her Personal Computer (PC) to access a remote Web site associated with a game provider.

Some players, however, may try to use automated game playing devices to unfairly help them during game play. For example, a player may create an automated game playing device that captures information when a puzzle is displayed on a computer screen. In this case, the automated game playing device may analyze the captured information and calculate an optimal solution to the puzzle (e.g., which balloon should be selected by the player). With the balloon puzzle game, a human player may be unable to match the speed and accuracy with which an automated game playing device can calculate the patterns that would emerge after a number of potential balloon removals and reconfigurations (e.g., especially patterns that would emerge after three or four such reconfigurations).

In a game involving multiple players (e.g., a puzzle tournament), such an automated game playing device may be a concern to other players, who can become discouraged if they are unable to compete with the automated game playing device. This will be particularly true if the players have provided payment in exchange for playing the game and/or are competing for a prize.

In addition to being a concern to other players, automated game playing devices can pose problems for game providers. Consider, for example, a game provider that promises to pay one thousand dollars to every player who successfully scores 1,000 points in a computer-based puzzle game. In this case, an automated game playing device may result in the game provider paying out an unfairly large number of prizes.

In addition to being a concern to other players, automated game playing devices can pose problems for game providers. Consider, for example, a game provider that promises to pay one thousand dollars to every player who successfully scores 1,000 points in a computer-based puzzle game. In this case, an automated game playing device may result in the game provider paying out an unfairly large number of prizes.

SUMMARY

To alleviate problems inherent in the prior art, the present invention introduces systems and methods wherein a reconfiguration rule is not indicated to a player during at least a portion of game play.

According to one embodiment, a game board having a plurality of game icons is displayed to a player. It is then arranged for the player to make a series of game moves. Each game move comprises: (i) receiving a player input, (ii) removing at least one game icon from the game board based on the player input, and (iii) reconfiguring the game board according to one of a plurality of reconfiguration rules. According to this embodiment, a reconfiguration rule to be applied during a game move is not indicated to the player during at least a portion of the game play.

Another embodiment is directed to facilitating game play at a game controller. According to this embodiment, it is arranged for a player to provide payment in exchange for game play. A game board having a plurality of game icons is then displayed via a remote player device. At least one reconfiguration rule to be applied during game play is indicated to the player, and at least one reconfiguration rule to be applied during game play is not indicated to the player during at least a portion of the game play. It is then arranged for the player to make a series of game moves. Each game move comprises: (i) receiving from the player a selection of a game icon, (ii) removing at least one game icon from the game board based on the selected game icon and an associated icon type, and (iii) reconfiguring the game board according to one of a plurality of reconfiguration rules. A game result is determined based on the series of game moves, and it is arranged for the player to receive payment of a monetary amount based on the game result.

According to another embodiment, it is arranged for a player to make a series of game moves. Each game move comprises: (i) receiving a game input, and (ii) reconfiguring a game display based on the game input according to one of a plurality of game rules. According to this embodiment, a game rule to be applied during a game move is not indicated to the player during at least a portion of the game play.

Another embodiment is directed to facilitating game play at a player device. According to this embodiment, an indication of a first game rule to be applied during game play is received from a remote game controller without receiving an indication of a second game rule to be applied during play. The indication of the first game rule is then displayed to the player.

One embodiment of the present invention comprises: means for displaying to a player a game board having a plurality of game icons; and means for arranging for the player to make a series of game moves. This embodiment further comprises: means for receiving a player input; means for removing at least one game icon from the game board based on the player input; and means for reconfiguring the game board according to one of a plurality of reconfiguration rules, wherein a reconfiguration rule to be applied during a game move is not indicated to the player during at least a portion of the game play.

Another embodiment comprises: means for arranging for a player to provide payment in exchange for game play; means for displaying via a remote player device a game board having a plurality of game icons; means for indicating to the player at least one reconfiguration rule to be applied during game play, wherein at least one reconfiguration rule to be applied during game play is not indicated to the player during at least a portion of the game play; means for arranging for the player to make a series of game moves; means for determining a game result based on the series of game moves; and means for arranging for the player to receive payment of a monetary amount based on the game result. This embodiment may further comprise: means for receiving from the player a selection of a game icon; means for removing at least one game icon from the game board based on the selected game icon and an associated icon type; and means for reconfiguring the game board according to one of a plurality of reconfiguration rules.

Another embodiment comprises: means for arranging for the player to make a series of game moves; means for receiving a game input; and means for reconfiguring the game display based on the game input according to one of a plurality of game rules, wherein a game rule to be applied during a game move is not indicated to the player during at least a portion of the game play.

Another embodiment comprises: means for receiving from a remote game controller an indication of a first game rule to be applied during game play without receiving an indication of a second game rule to be applied during play; and means for displaying to a player the indication of the first game rule.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 5 is a tabular representation of a portion of a game play database according to an embodiment of the present invention.

FIG. 7 is a tabular representation of a portion of a player database according to an embodiment of the present invention.

FIG. 8 is a tabular representation of a portion of a game database according to an embodiment of the present invention.

FIG. 9 is a tabular representation of a portion of a reconfiguration rule database according to an embodiment of the present invention.

DETAILED DESCRIPTION

Embodiments of the present invention are directed to systems and methods wherein a “game display” is provided to a player. As used herein, the phrase “game display” may refer to any information that is provided to a player during game play. The game display may comprise, for example, a game board having a number of text-based or graphical game icons (e.g., colored balloons, tiles with symbols, or pictures of famous people).

Game System Overview

Figure 1:
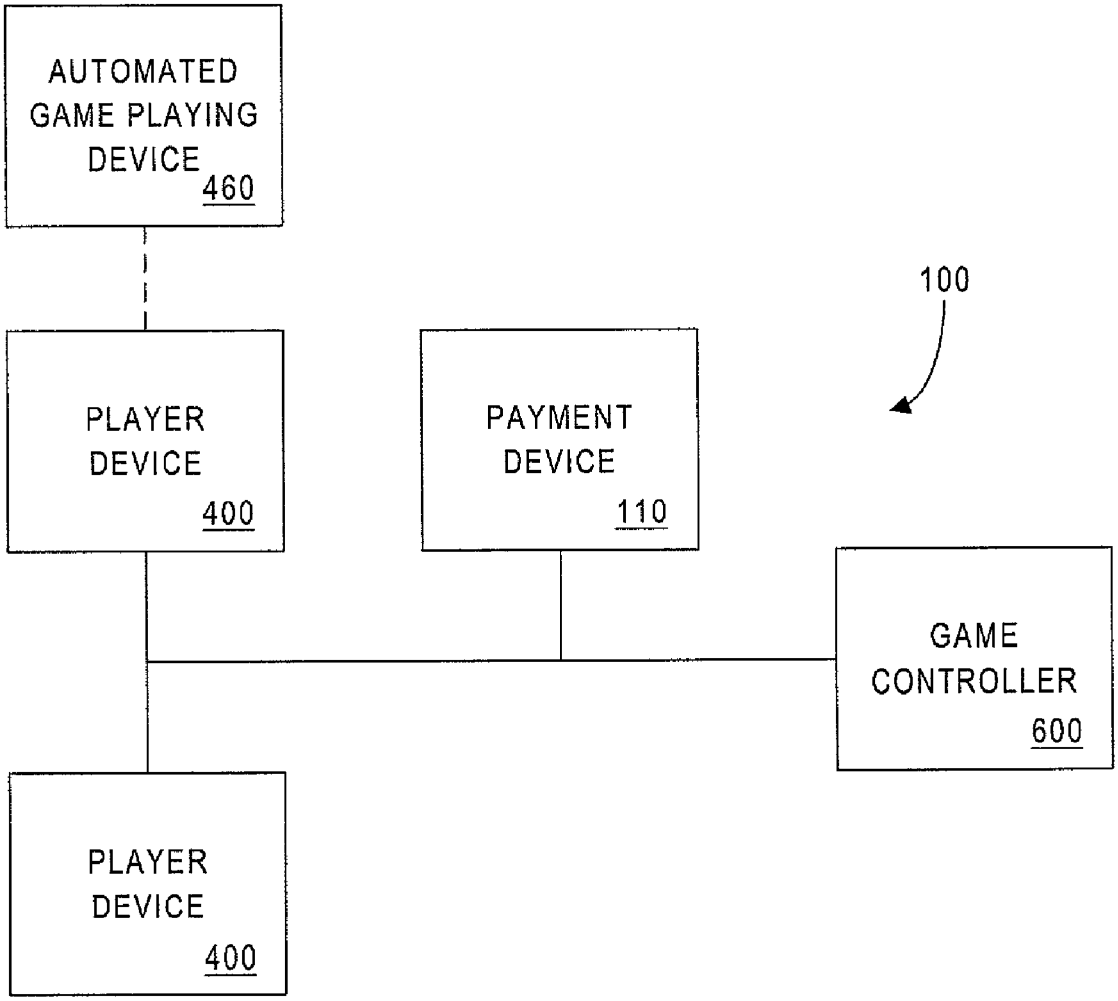
FIG. 1 is a block diagram overview of a game system according to an embodiment of the present invention.

Turning now in detail to the drawings, FIG. 1 is a block diagram of a game system 100 according to one embodiment of the present invention. The game system 100 includes a game controller 600 in communication with a number of remote player devices 400. As used herein, devices (such as the player devices 400 and the game controller 600) may communicate, for example, via a communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a cable television network, or an Internet Protocol (IP) network such as the Internet, an intranet or an extranet. Moreover, as used herein, communications include those enabled by wired or wireless technology. Note that although a single game controller 600 is shown in FIG. 1, any number of game controllers 600 may be included in the game system 100. Similarly, any number of the other devices described herein may be included in the game system 100 according to embodiments of the present invention.

In one embodiment, a player device 400 communicates with a remote, Web-based game controller 600 (e.g., a server) via the Internet. Although some embodiments are described with respect to information exchanged via a game provider’s Web site, according to other embodiments information is instead exchanged, for example, via: a telephone, an Interactive Voice Response Unit (IVRU), electronic mail, a WEBTV® interface, a cable network interface, and/or a wireless communication system.

The player device 400 and the game controller 600 may be any devices capable of performing various functions described herein. The player device 400 may be, for example: a PC, a portable computing device such as a Personal Digital Assistant (PDA), a wired or wireless telephone, a one-way or two-way pager, a kiosk (e.g., a game kiosk located at an airport terminal), an interactive television device, a game terminal (e.g., a SONY PLAY STATION® video game terminal), or any other appropriate storage and/or communication device.

Note that the devices shown in FIG. 1 need not be in constant communication. For example, the player device 400 may only communicate with the game controller 600 via the Internet when appropriate (e.g., when attached to a “docking” station or “cradle” coupled to the player’s PC).

The player device 400 may also communicate with the game controller 600 via an infrared device when near a game kiosk.

A player can use a player device 400 to receive information associated with game play. For example, a player may view a puzzle game board via the player device 400. The player device 400 may also be used to provide or generate player inputs during game play. For example, a player may use a keyboard or mouse coupled to his or her PC to select one or more game icons in a puzzle game board.

As shown in FIG. 1, a player may also attempt to use an automated game playing device 460 to help him or her during game play. The automated game playing device 460 may be, for example, a modified game program or a separate software program that is being executed on the player device 400. For example, a player may create an automated game playing device 460 that analyzes puzzle information received by, or stored at, the player device 460 in order to generate or suggest an optimal solution to the puzzle (e.g., which game icons should be selected by the player).

Figure 2:
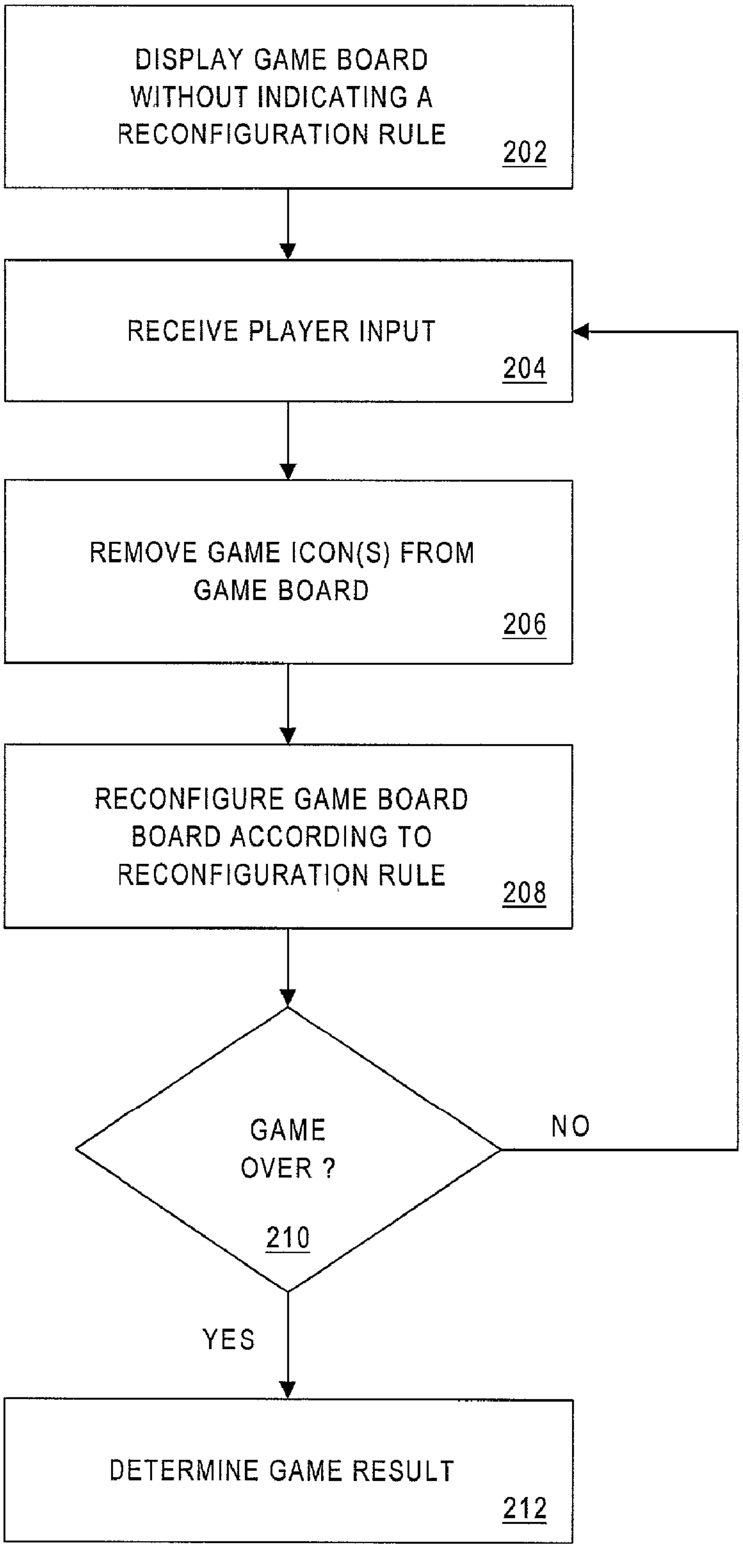
FIG. 2 is a flow chart of a method for facilitating game play according to an embodiment of the present invention.

FIG. 2 is a flow chart of a method for facilitating game play according to an embodiment of the present invention. The flow charts in FIG. 2 and the other figures described herein do not imply a fixed order to the steps, and embodiments of the present invention can be practiced in any order that is practicable. Moreover, the methods may be performed by any of the devices described herein. The method shown in FIG. 2 may be performed, for example, by the game controller 600.

At 202, a game board with a number of game icons is displayed to a player. The game board may comprise, for example, an array of differently colored balloons (e.g., red, green, blue, and yellow balloons). As will be explained, at least one reconfiguration rule to be applied during game play is not indicated to the player. For example, the player may be told that balloons will be shifted "up" during his or her first move without being told how the balloons will be shifted later in the game (i.e., during his or her third and fourth moves).

At 204, a player input is received, and one or more game icons are removed from the game board at 206. For example, a player may select one or more balloons from the game board. In this case, the selected balloon or balloons are removed from the game board along with any neighboring balloons of the same color, and the player's score is increased based on the number of balloons that are removed (e.g., based on the length of the "chain" of neighboring balloons of the same color).

Note that the reconfiguration rule applied during a game move is not indicated to the player during at least a portion of the game play. For example, a player may never be told which reconfiguration rule will be applied during any give move. In this case, however, the game may be considered a game of chance as (e.g., gambling) opposed to a game of skill. According to another embodiment, a reconfiguration rule is indicated to the player prior to a move even though it is not indicated during at least a portion of the game play. For example, a player may only be told the next two reconfiguration rules that will be applied during game play. That is, by indicating some (but not all) of the reconfiguration rules to be applied during game play, the game may still be considered a game of skill as opposed to a game of chance. Moreover, the ability of an automated game playing device 460 to calculate the configuration and/or patterns that may emerge in a game board beyond that point will still be hindered. According to one embodiment, the reconfiguration rules are not transmitted from the game controller 600 to the player device 400 during at least a portion of the game to prevent an automated game playing device 460 from detecting the rules (e.g., by intercepting a communication or by examining a memory location).

At 208, the game board is reconfigured according to one of a number of different reconfiguration rules. For example, one reconfiguration rule may indicate that balloons will be shifted "up" to fill-in any holes created after balloons are removed. Other reconfiguration rules may indicate that balloons will be shifted "left," "right," or "down." Note that balloons may shift in more than one direction during a reconfiguration. For example, balloons may shift "up" and to the "left" to fill-in any holes in the game board.

If the game is not over at 210, another player input is received at 204 and the process continues. If the game is over at 210, a game result is determined at 212. For example, a game may be over when no more balloons can be removed, all of the balloons have been removed, a predetermined number of moves have been made, and/or a predetermined period of time expires. A game result may indicate, for example, a player's total score and/or a prize that the player has won based on his or her performance during game play.

Figure 3:
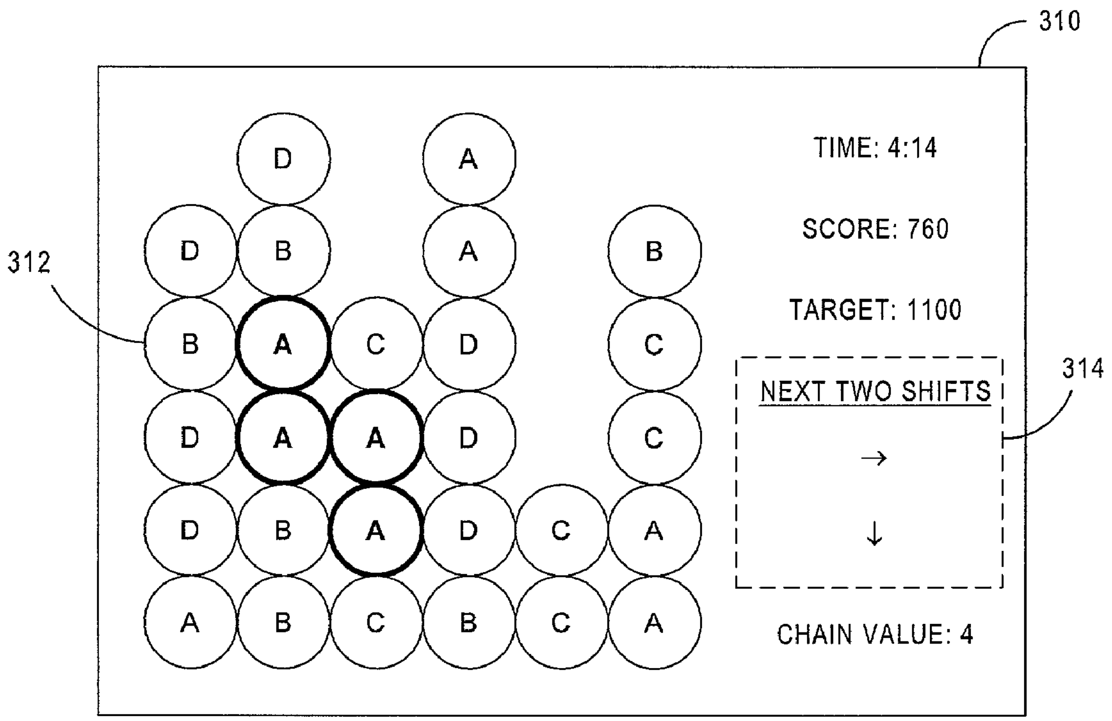
FIG. 3 illustrates game displays according to an embodiment of the present invention.
Figure 3:
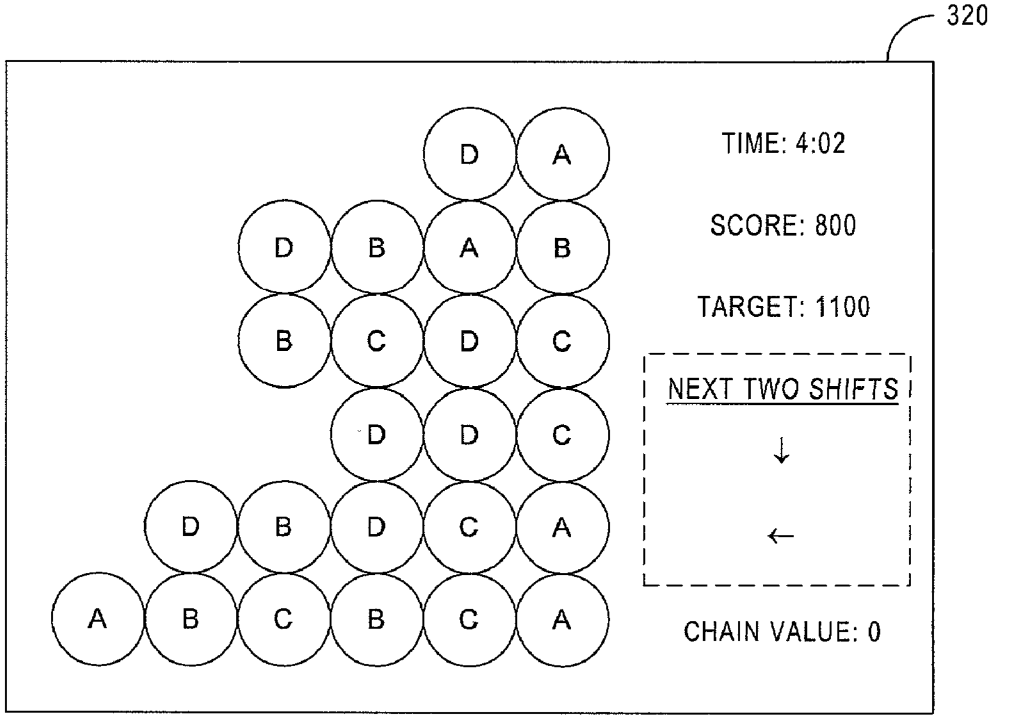

By way of example, consider the first game display 310 shown in FIG. 3. In this case, a game board includes an array of game icons 312 each associated with an icon type (represented by the letters "A," "B," "C," and "D"). The first game display 310 also includes an indication 314 of the next two reconfiguration rules that will be applied during game play. In particular, the indication 314 shows that the game icons 312 will be shifted: (i) to the right after the player's next move, and (ii) down after the following move. According to the present invention, the indication 314 does not show how the game icons 312 will be reconfigured after every move during game play (e.g., at least some of the reconfiguration rules that will be applied during game play are not indicated to the player).

As shown in the first game display 310, the player has selected four neighboring "A" type game icons 312 to be removed (represented by bold characters). The second game display 320 illustrates the game board after these selected game icons 312 are removed and the game board is reconfigured. In particular, the game icons 312 have been shifted to the right to fill-in the holes that were created when the selected game icons 312 were removed. According to one embodiment, the player's score is adjusted based on the number of game icons 312 that were removed from the game board.

The game controller 600 may determine which reconfigure rule will be applied during a particular game move in a number of different ways. For example, the game controller 600 may randomly select a reconfiguration rule or retrieve a pre-stored indication of a reconfiguration rule from a database. Moreover, the series of reconfiguration rules that are applied during game play may be associated with a particular game played by a player, a plurality of games, and/or a plurality of players.

According to one embodiment, it is arranged for the player to provide payment in exchange for game play. For example, the game controller 600 may arrange for the player to provide payment via a payment identifier associated with a credit card account, a debit card account, a bank account, and/or a digital payment protocol. The game controller 600 may also arrange for a player to receive a prize (e.g., payment of a prize amount) based on a game result. As shown in FIG. 1, a payment device 110 can be used to arrange for the player to provide or receive payment (e.g., payment of a monetary amount or an alternate currency amount such as a gift certificate).

As described above, the present invention may be directed to a game of skill (i.e., a game in which a game result is determined predominately by skill as opposed to chance), such as an arcade-style game in which a player removes game icons from a game board.

Player Device

Figure 4:
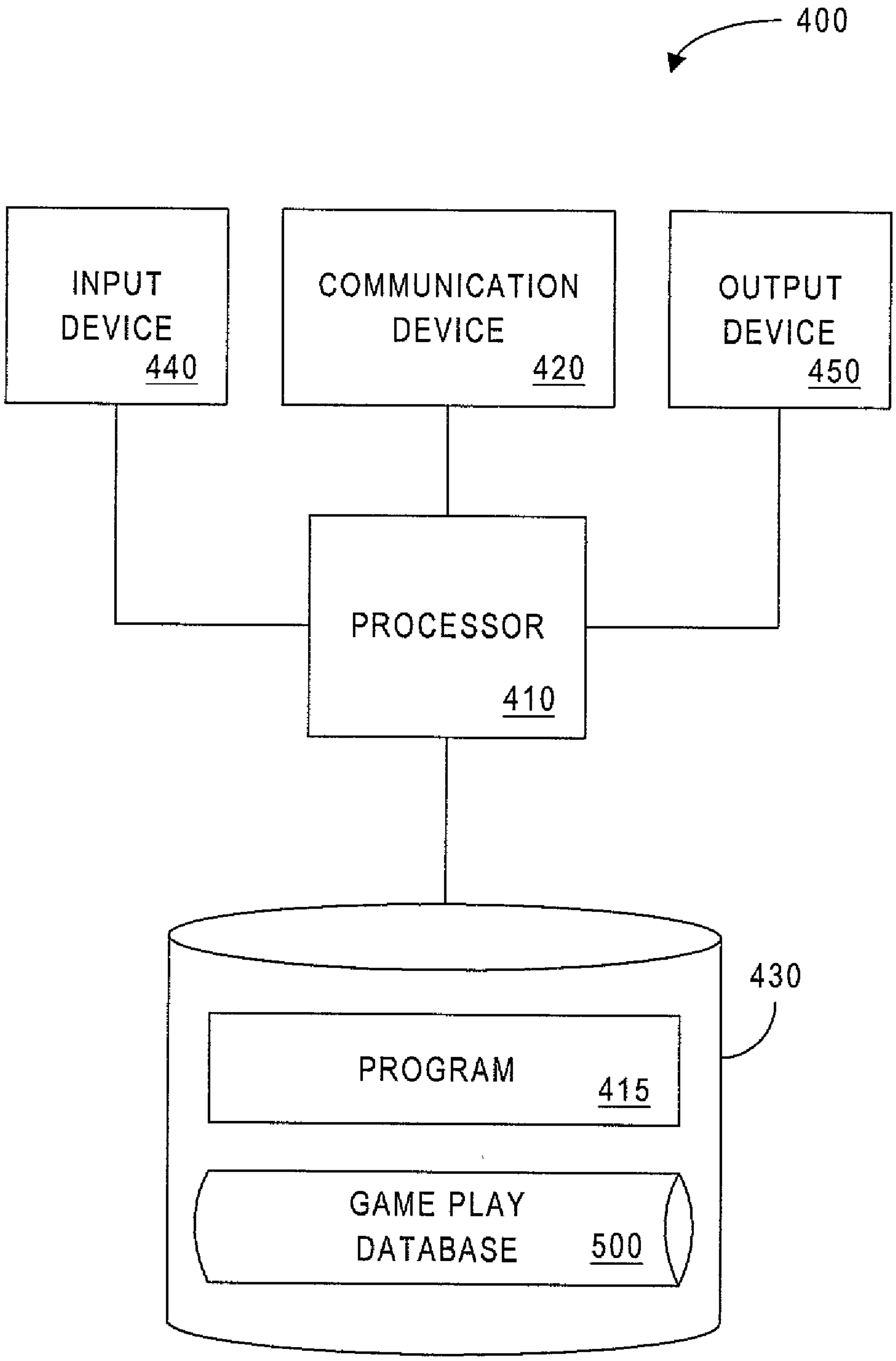
FIG. 4 is a block diagram of a player device according to an embodiment of the present invention.

FIG. 4 illustrates a player device 400 that is descriptive of the device shown in FIG. 1 according to an embodiment of the present invention. The player device 400 comprises a processor 410, such as one or more INTEL® Pentium® processors, coupled to a communication device 420 configured to communicate via a communication network (not shown in FIG. 4). The communication device 420 may be used to communicate, for example, with the game controller 600 and/or the payment device 110.

The processor 410 is also in communication with an input device 440. The input device 440 may comprise, for example, a keyboard, a mouse or other pointing device, a microphone, a knob or a switch (including an electronic representation of a knob or a switch), an infrared port, a docking station, and/or a touch screen. Such an input device 440 may be used, for example, to provide player inputs (e.g., by manipulating a pointer associated with a computer-based puzzle game).

The processor 410 is also in communication with an output device 450. The output device 440 may comprise, for example, a display (e.g., a computer monitor), a speaker, and/or a printer. The output device 450 may be used, for example, to provide game information to a player (e.g., by displaying a game board to the player).

The processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 430 stores a program 415 for controlling the processor 410. The processor 410 performs instructions of the program 415, and thereby operates in accordance with the present invention. For example, the processor 410 may receive from a remote game controller 600 an indication of a first game rule (e.g., a reconfiguration rule) to be applied during game play without receiving an indication of a second game rule to be applied during play. The processor 410 may also display the indication of the first game rule to a player.

As used herein, information may be "received" by or "transmitted" to, for example: (i) the player device 400 from the game controller 600; or (ii) a software application or module within the player device 400 from another software application, module, or any other source.

Figure 12:
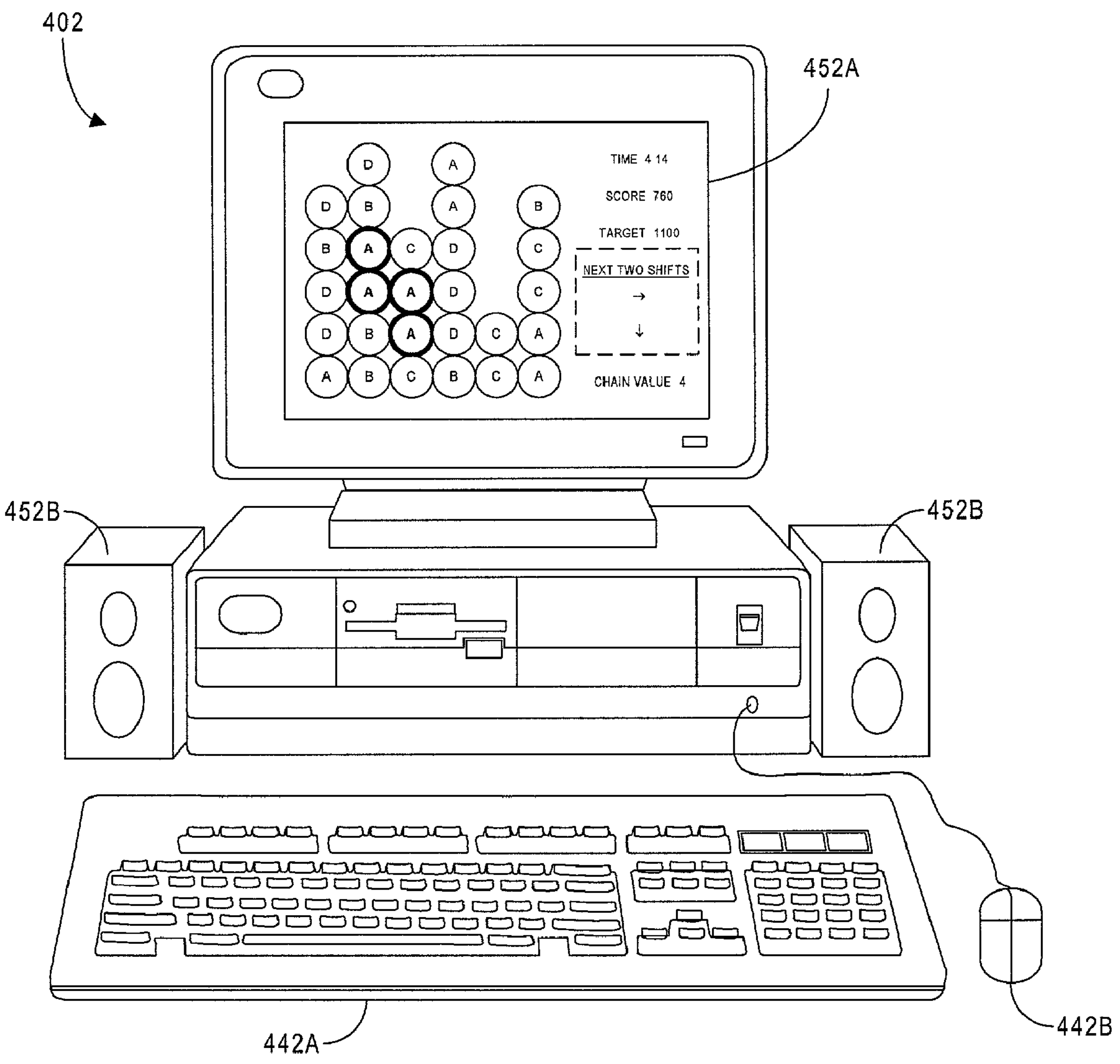
FIGS. 12 through 14 illustrate player devices displaying game information according to some embodiments of the present invention.

FIG. 12 illustrates a PC 402 displaying a computer-based puzzle game according to an embodiment of the present invention. The PC 402 includes a keyboard 442A and a mouse 442B which can be used by a player to provide player inputs (e.g., game icon selections). The PC 402 also includes a computer display 452A and speakers 452B which can be used, for example, to provide a game board to a player along with an indication of one or more reconfiguration rules.

Figure 13:
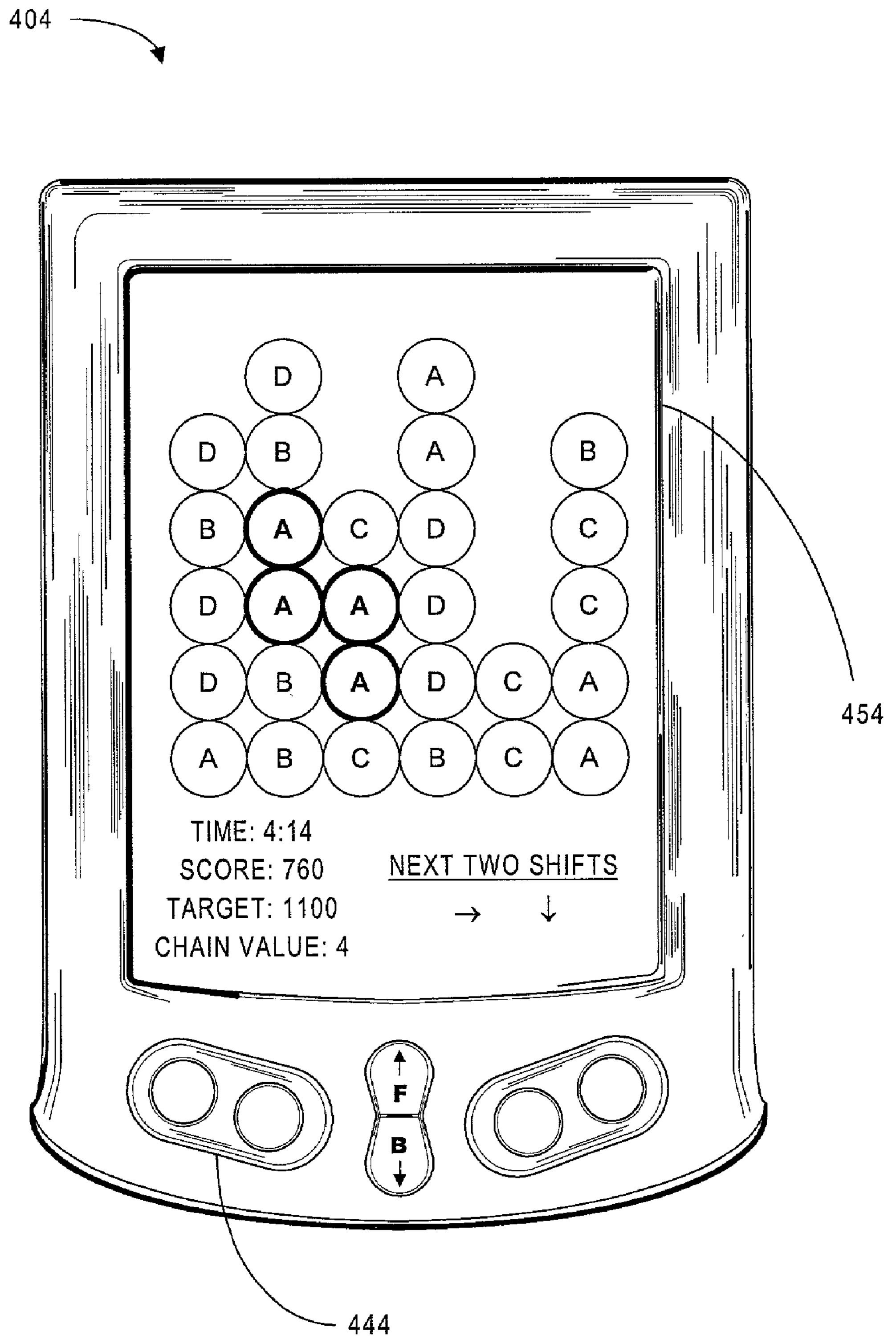
Figure 14:
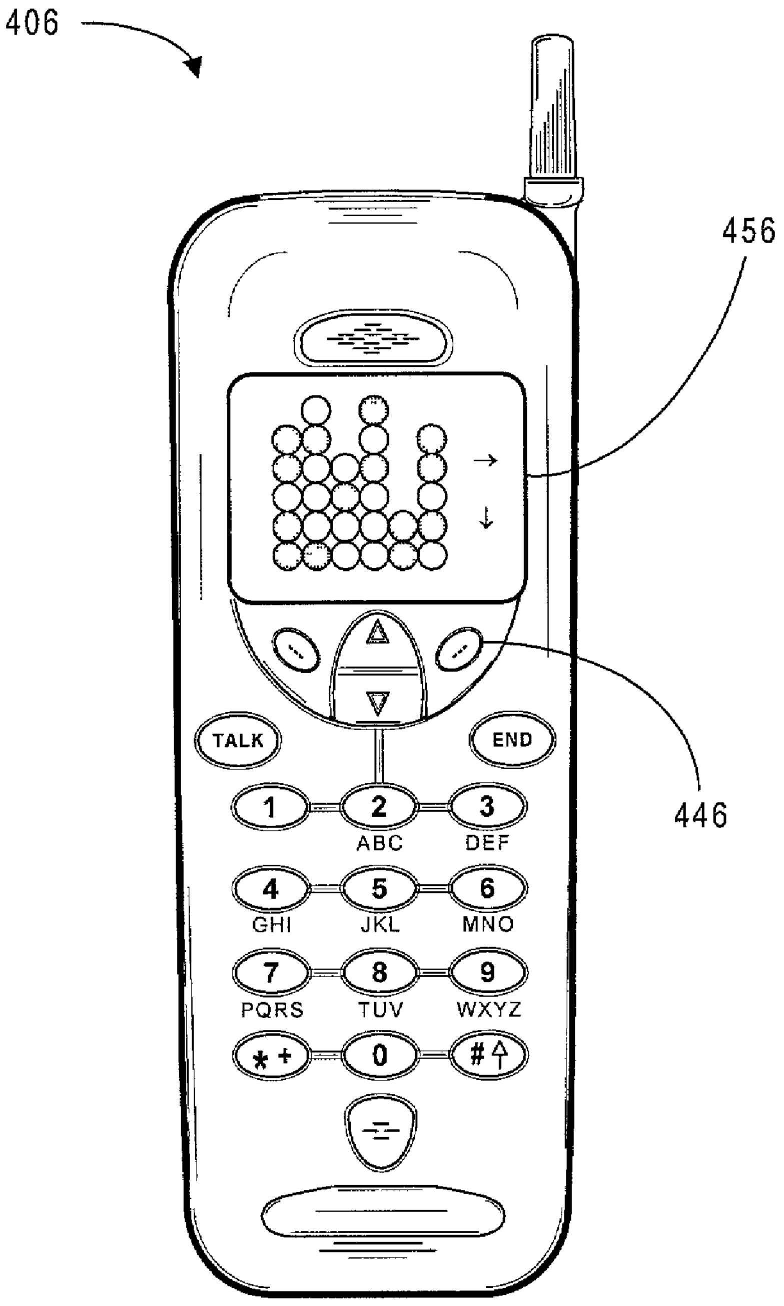

FIG. 13 illustrates a PDA 404 displaying a computer-based puzzle game according to another embodiment of the present invention. The PDA 404 includes an input device 444 and an output device 454 (e.g., a display screen) that may be used by a player during game play. Similarly, FIG. 14 illustrates a wireless telephone 406 including an input device 446 and an output device 456 displaying a computer-based puzzle game.

As shown in FIG. 4, the storage device 430 also stores a game play database 500. An example of a game play database 500 will now be described in detail with respect to FIG. 5. The illustrations and accompanying descriptions of the databases presented herein are exemplary, and any number of other database arrangements could be employed besides those suggested by the figures.

Game Play Database

Referring to FIG. 5, a table represents the game play database 500 that may be stored at a player device 400 according to an embodiment of the present invention. The table includes an entry identifying a game that is being played by a player via the game system 100. The table also defines fields 502, 504, 506, 508 for the entry. The fields specify: a game identifier 502, a player identifier 504, next reconfiguration rules 506, and a current score 508. The information in the game play database 500 may be created and updated, for example, as a player plays a game via the game system 100.

The game identifier 502 may be, for example, an alphanumeric code associated with a game that is being played via the game system 100. The player identifier 504 represents a player who is playing the game.

The next reconfiguration rules 506 indicate which reconfiguration rules will be applied during a portion of game play. Note that, according to one embodiment, each reconfiguration rule is associated with a discrete move during game play. According to another embodiment, each reconfiguration rules is associated with a period of time or some other game information. For example, a reconfiguration rule may be applied for 30 seconds or until a player selects a particular type of game icon (e.g., a game icon having a hidden function that alters the reconfiguration rule that will be applied). Note that a limited number of reconfiguration rules may be stored in the game play database 500 and/displayed to the player.

The current score 508 may represent, for example, how many points a player has scored in a particular game.

Game Controller

Figure 6:
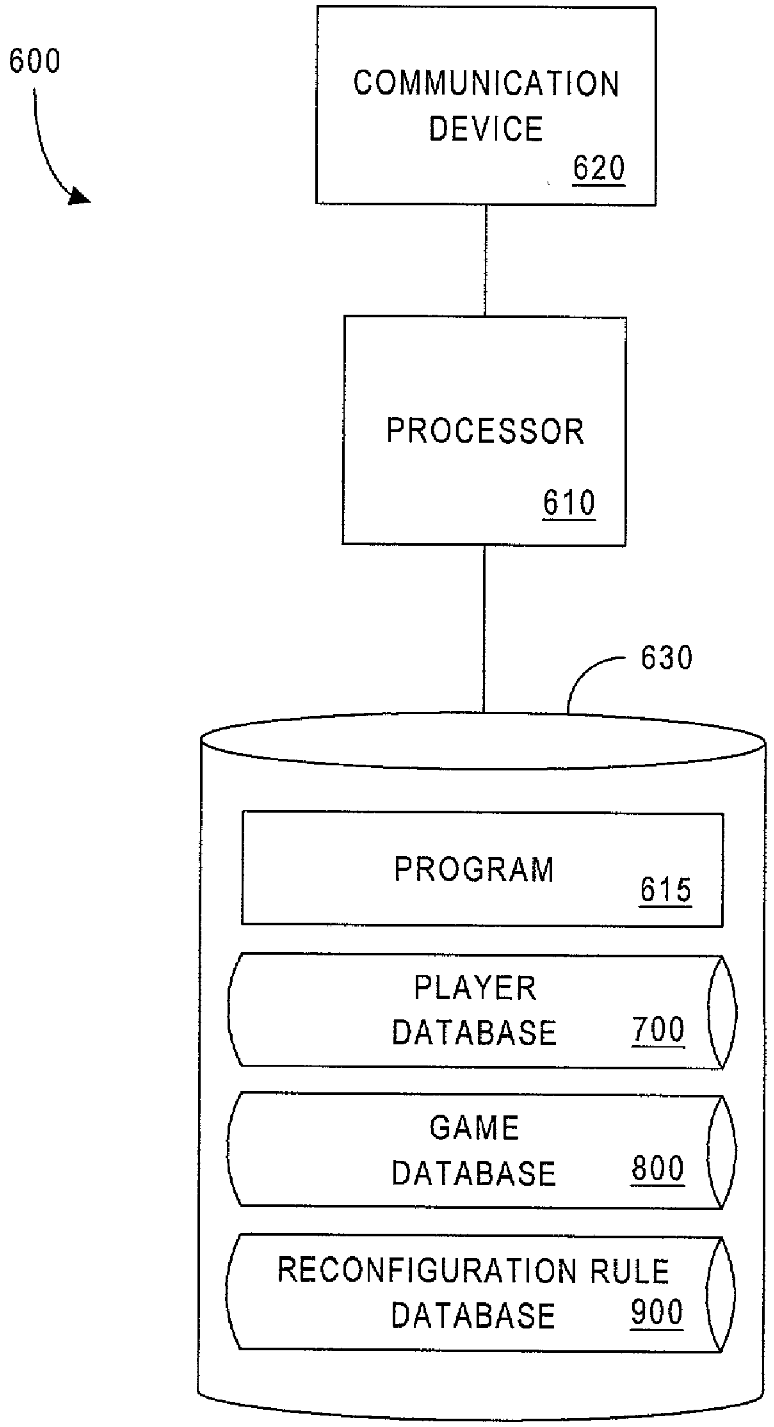
FIG. 6 is a block diagram of a game controller according to an embodiment of the present invention.

FIG. 6 illustrates a game controller 600 that is descriptive of the device shown in FIG. 1 according to an embodiment of the present invention. The game controller 600 comprises a processor 610, such as one or more INTEL® Pentium® processors, coupled to a communication device 620 configured to communicate via a communication network (not shown in FIG. 6). The communication device 620 may be used to communicate, for example, with one or more player devices 400 and/or the payment device 110.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as RAM devices and ROM devices.

The storage device 630 stores a program 615 for controlling the processor 610. The processor 610 performs instructions of the program 615, and thereby operates in accordance with the present invention. For example, the processor 610 may display to a player a game board having a plurality of game icons. The processor 610 may also arrange for the player to make a series of game moves. In particular, the processor 610 may receive a player input and remove at least one game icon from the game board based on the player input. According to an embodiment of the present invention, the processor 610 also reconfigures the game board according to one of a plurality of reconfiguration rules, wherein a reconfiguration rule to be applied during a game move is not indicated to the player during at least a portion of the game play.

According to another embodiment, the processor 610 arranges for a player to provide payment in exchange for game play and displays via a remote player device 400 a game board having a plurality of game icons. The processor 610 indicates to the player at least one reconfiguration rule to be applied during game play, wherein at least one reconfiguration rule to be applied during game play is not indicated to the player during at least a portion of the game play. The processor 610 also arranges for the player to make a series of game moves and determines a game result based on the series of game moves. The processor 610 may then arrange for the player to receive payment of a monetary amount based on the game result.

According to still another embodiment, the processor 610 arranges for the player to make a series of game moves, and a game rule to be applied during a game move is not indicated to the player during at least a portion of the game play.

The program 615 may be stored in a compressed, uncompiled and/or encrypted format. The program 615 may furthermore include other program elements, such as an operating system, a database management system, and/or device drivers used by the processor 610 to interface with peripheral devices.

As used herein, information may be "received" by or "transmitted" to, for example: (i) the game controller 600 from the player device 400; or (ii) a software application or module within the game controller 600 from another software application, module, or any other source.

As shown in FIG. 6, the storage device 630 also stores a player database 700 (described with respect to FIG. 7), a game database 800 (described with respect to FIG. 8), and a reconfiguration rule database 900 (described with respect to FIG. 9). Examples of databases that may be used in connection with the game controller 600 will now be described in detail with respect to FIGS. 7 through 9.

Player Database

Referring to FIG. 7, a table represents the player database 700 that may be stored at the game controller 600 according to an embodiment of the present invention. The table includes entries identifying players who may play games via the game system 100. The table also defines fields 702, 704, 706, 708, 710 for each of the entries. The fields specify: a player identifier 702, a name 704, contact information 706, a payment identifier 708, and an account balance 710. The information in the player database 700 may be created and updated, for example, based on information received from player when he or she registers with the game controller 600. The information in the player database 700 may also be based on, for example, information generated as the player plays games via the game system 100.

The player identifier 702 may be, for example, an alphanumeric code associated with a player who has registered to use the game system 100. The player identifier 702 may be generated by, for example, the game controller 600 or the player (e.g., when he or she provides a user name and password) and may be based on, or associated with, the player identifier 504 stored in the game play database 500. The player database 700 also stores the name 704 and contact information 706 (e.g., a postal address, an electronic mail address, an IP address, or a telephone number) associated with each player.

The payment identifier 708 may comprise, for example, a credit card, debit card or bank account number (e.g., a checking account number) or digital payment protocol information. The account balance 710 may represent, for example, an amount that a player owes to a game provider or an amount that the game provider owes to the player. The payment identifier 708 and the account balance 710 may be used, for example, by the game controller 600 to arrange for the player to provide or receive payment (e.g., based on game play).

Game Database

Referring to FIG. 8, a table represents the game database 800 that may be stored at the game controller 600 according to an embodiment of the present invention. The table includes entries identifying games that are being (or have been) played via the game system 100. The table also defines fields 802, 804, 806, 808 for each of the entries. The fields specify: a game identifier 802, a player identifier 804, indicated reconfiguration rules 806, and non-indicated reconfiguration rules 808. The information in the game database 800 may be created and updated, for example, as players play games via the game system 100.

The game identifier 802 may be, for example, an alphanumeric code associated with a game that is being (or has been) played via the game system 100. The game identifier 802 may be based on, or associated with, the game identifier 502 stored in the game play database 500. The player identifier 804 represents a player who is playing the game and may be based on, or associated with, the player identifier 702 stored in the player database 700 and/or the player identifier 504 stored in the game play database 500.

The indicated reconfiguration rules 806 are associated with reconfiguration rules that are being displayed to a player and/or have been transmitted to a remote player device 400. The non-indicated reconfiguration rules 808 are associated with reconfiguration rules that will be applied during game play but that have not yet been displayed to a player and/or transmitted to a remote player device 400. Note that the fourth entry shown in FIG. 8 illustrates how other types of reconfiguration rules 806, 808 cam be used according to embodiments of the present invention.

Reconfiguration Rule Database

Referring to FIG. 9, a table represents the reconfiguration rule database 900 that may be stored at the game controller 600 according to an embodiment of the present invention. The table includes entries associated with reconfiguration rules that may be applied during game play. The table also defines fields 902, 904 for each of the entries. The fields specify: a reconfiguration rule identifier 902 and a description 904. The information in the reconfiguration rule database 900 may be created and updated, for example, by the game controller 600.

The reconfiguration rule identifier 902 may be, for example, an alphanumeric code associated with a reconfiguration rule that may be applied during game play. Note that the reconfiguration rule identifier 902 may be based on, or associated with, the next reconfiguration rules 506 stored in the game play database 500 and/or the indicated reconfiguration rules 806 and non-indicated reconfiguration rules 808 stored in the game database 800. The description 904 indicates how the reconfiguration rule will be applied during game play. For example, the description 904 may indicate that game icons (e.g., balloons) will be shifted to the left during a game move.

Methods that may be used in connection with the game system 100 according to some embodiments of the present invention will now be described in detail with respect to FIGS. 9 and 10.

Game System Methods

Figure 10:
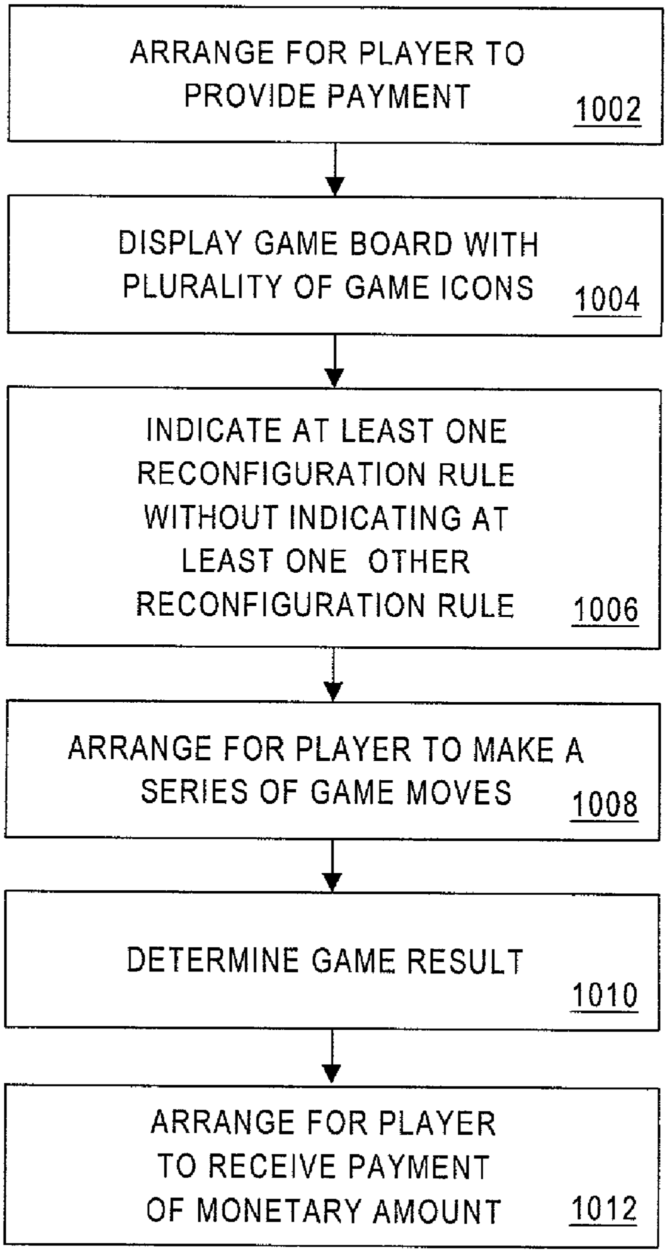
FIG. 10 is a flow chart of a computer-implemented method for facilitating game play at a game controller according to an embodiment of the present invention.

FIG. 10 is a flow chart of a computer-implemented method for facilitating game play at a game controller 600. In this case, game play is associated with a game of skill in which a player removes game icons from a game board. At 1002, it is arranged for the player to provide a payment in exchange for playing a game. For example, the game controller 600 may transmit a payment identifier 708 to a payment device 110 to arrange for the player to provide a payment of one dollar in exchange for game play (and the account balance 710 stored in the player database 700 may be updated accordingly).

At 1004, a game board having a plurality of game icons is displayed to the player. For example, the game controller 600 may transmit information to a remote player device 400 enabling the player device 400 to display an array of colored balloons to the player.

At 1006, at least one reconfiguration rule is indicated to the player without indicating at least one other reconfiguration rule that will be applied during game play. For example, the game controller 600 may transmit an indication of only the next two reconfiguration rules that will be applied during game play. According to one embodiment, the game controller 600 transmits to the player device 400 the indicated reconfiguration rules 806 stored in the game database 800 without transmitting the non-indicated reconfiguration rules 808. The player device 400 may then store the next reconfiguration rules 506 in the game play database 500.

At 1008, it is arranged for the player to make a series of game moves. For example, each game move may comprise: (i) receiving from the player a selection of a game icon, (ii) removing at least one game icon from the game board based on the selected game icon and an associated icon type, and (iii) reconfiguring the game board according to one of a plurality of reconfiguration rules. According to one embodiment, the game board is reconfigured as defined by the appropriate rule in the reconfiguration rule database 900.

At 1010, a game result is determined based on the series of moves made by the player and it is arranged for the player to receive payment of a monetary amount based on the game result at 1012. The game controller 600 may also update the account balance 710 stored in the player database 700.

Figure 11:
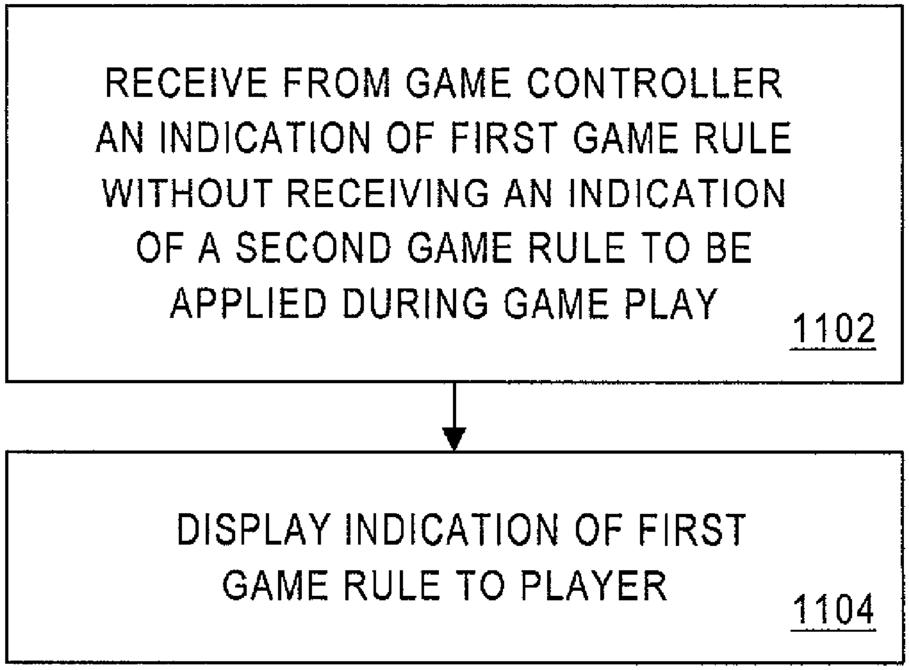
FIG. 11 is a flow chart of a method for facilitating game play at a player device according to an embodiment of the present invention.

FIG. 11 is a flow chart of a method that may be performed by a player device 400 according to an embodiment of the present invention. At 1102, the player device 400 receives from a remote game controller 600 an indication of a first game rule without receiving an indication of a second game rule that will be applied during game play. For example, the player device 400 may only receive an indication of which reconfiguration rules will be applied after each of the player's next four moves. According to one embodiment, the player device 400 stores the next reconfiguration rules 506 in the game play database 500.

At 1104, the player device 400 displays the indication of the first game rule to the player. The player device 400 may also receive from the player a player input and arrange (e.g., directly or via the game controller 600) for a game board to be reconfigured based on the player input in accordance with the first game rule, wherein the game board has a plurality of game icons that may be removed by the player.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the abovedescribed apparatus and methods to accommodate these and other embodiments and applications.

Although some embodiments of the present invention have been described with respect to a game rule comprising a reconfiguration rule, the present invention is also applicable with other types of game rules. Consider, for example, a maze game in which portions of the maze (or item within the maze) shift during game play. In this case, the game rule may comprise a time and/or direction of such a shift. According to another embodiment, a game rule may be associated with how a game icon will be added to a game board.

As described herein, a game controller 600 may transmit an indication of a first reconfiguration rule to a player device 400 without transmitting an indication of a second reconfiguration rule. According to another embodiment, the game controller 600 instead transmits an encrypted version of both reconfiguration rules to the player device 400. In this case, the game controller 600 transmits additional information (e.g., decryption keys) during game play enabling the player device 400 to decrypt additional reconfiguration rules as appropriate.

Although most of the embodiments described herein are associated with a game controller 600 transmitting indications of reconfiguration rules to a player device 400, according to another embodiment this function is instead performed by a player device 400. Consider, for example, a game in which a first player at a first player device 400 plays against a second player at a second player device 400. In this case, the first player device 400 may transmit only a limited amount of information associated with reconfiguration rules to the second player device 400. Similarly, although most of the embodiments described herein are associated with a game played by a single player, the present invention can also be used with respect to games involving multiple players (e.g., teams of players).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method, comprising:

providing a game board to a player, wherein the game board defines a game boundary;

providing a first game rule to the player, wherein the first game rule indicates how removal of a game icon from within the game boundary will cause remaining game icons to shift within the game boundary;

receiving a first game input from the player, wherein the first game input is associated with a first game icon displayed within the game boundary;

removing a first set of icons that are at least adjacent to the first game icon, wherein the removal of the first set of icons defines a second set of icons that remain within the game boundary;

shifting at least a portion of the second set of game icons that remain within the game boundary, wherein the shifting is based on the first game rule; and revealing, after receiving the first game input, a second game rule to the player, wherein the second game rule indicates how removal of a game icon from within the game boundary will cause remaining game icons to shift within the game boundary, and wherein the second game rule is different from the first game rule.

2. The method of claim 1, wherein the first set of game icons are associated with an icon type equivalent to an icon type associated with the first game icon.

3. The method of claim 1, further comprising: adjusting a game score, after receiving the first game input, based on a number of game icons comprising the first set of game icons.

4. The method of claim 1, wherein the second game rule is determined via at least one of: (i) a random selection, and (ii) a retrieval of a pre-stored indication.

5. The method of claim 1, further comprising:

receiving payment from the player.

6. The method of claim 5, wherein the receiving of payment from the player comprises at least one of: (i) receiving a payment identifier, (ii) charging a credit card account, (iii) charging a debit card account, (iv) receiving currency, and (v) charging a bank account.

7. The method of claim 1, further comprising:

awarding, in the case that all game icons are cleared from the game board, a prize to the player.

8. The method of claim 7, wherein the prize comprises payment of at least one of: (i) a monetary amount, and (ii) an alternate currency amount.

9. The method of claim 1, wherein the receiving of the first game input comprises receiving player input from a remote player device via a communication network.

10. A computer-readable medium containing instructions configured to direct a processor to:

provide a game board to a player, wherein the game board defines a game boundary;

provide a first game rule to the player, wherein the first game rule indicates how removal of a game icon from within the game boundary will cause remaining game icons to shift within the game boundary;

receive a first game input from the player, wherein the first game input is associated with a first game icon displayed within the game boundary;

remove a first set of icons that are at least adjacent to the first game icon, wherein the removal of the first set of icons defines a second set of icons that remain within the game boundary;

shift at least a portion of the second set of game icons that remain within the game boundary, wherein the shifting is based on the first game rule; and reveal, after receiving the first game input, a second game rule to the player, wherein the second game rule indicates how removal of a game icon from within the game boundary will cause remaining game icons to be shift within the game boundary, and wherein the second game rule is different from the first game rule.

11. An apparatus, the apparatus comprising:

a processor; and memory in communication with the processor, the memory storing instructions directing the processor to:

provide a game board to a player, wherein the game board defines a game boundary;

provide a first game rule to the player, wherein the first game rule indicates how removal of a game icon from within the game boundary will cause remaining game icons to shift within the game boundary;

receive a first game input from the player, wherein the first game input is associated with a first game icon displayed within the game boundary;

remove a first set of icons that are at least adjacent to the first game icon, wherein the removal of the first set of icons defines a second set of icons that remain within the game boundary;

shift at least a portion of the second set of game icons that remain within the game boundary, wherein the shifting is based on the first game rule; and reveal, after receiving the first game input, a second game rule to the player, wherein the second game rule indicates how removal of a game icon from within the game boundary will cause remaining game icons to shift within the game boundary, and wherein the second game rule is different from the first game rule.

12. A method, comprising:

providing a game board to a player, wherein the game board defines a game boundary;

providing a first game rule to the player, wherein the first game rule is selected randomly from a plurality of available game rules that each indicate how removal of a game icon from within the game boundary will cause remaining game icons to be reconfigured within the game boundary;

receiving a first game input from the player, wherein the first game input is associated with a first game icon displayed within the game boundary;

removing a first set of icons that are at least adjacent to the first game icon, wherein the removal of the first set of icons defines a second set of icons that remain within the game boundary;

reconfiguring at least a portion of the second set of game icons that remain within the game boundary, wherein the reconfiguration is based on the first game rule; and revealing, after receiving the first game input, a second game rule to the player, wherein the second game rule is selected randomly from the plurality of available game rules.

13. The method of claim 12, further comprising:

receiving, after the revealing, a second game input from the player, wherein the second game input is associated with a second game icon displayed within the game boundary;

removing a third set of icons that are at least adjacent to the second game icon, wherein the removal of the third set of icons defines a fourth set of icons that remain within the game boundary; and reconfiguring at least a portion of the fourth set of game icons that remain within the game boundary, wherein the reconfiguration is based on the second game rule.

14. A computer-readable medium containing instructions configured to direct a processor to:

provide a game board to a player, wherein the game board defines a game boundary;

provide a first game rule to the player, wherein the first game rule is selected randomly from a plurality of available game rules that each indicate how removal of a game icon from within the game boundary will cause remaining game icons to be reconfigured within the game boundary;

receive a first game input from the player, wherein the first game input is associated with a first game icon displayed within the game boundary;

remove a first set of icons that are at least adjacent to the first game icon, wherein the removal of the first set of icons defines a second set of icons that remain within the game boundary;

reconfigure at least a portion of the second set of game icons that remain within the game boundary, wherein the reconfiguration is based on the first game rule; and reveal, after receiving the first game input, a second game rule to the player, wherein the second game rule is selected randomly from the plurality of available game rules.

15. An apparatus, the apparatus comprising:

a processor; and memory in communication with the processor, the memory storing instructions directing the processor to:

provide a game board to a player, wherein the game board defines a game boundary;

provide a first game rule to the player, wherein the first game rule is selected randomly from a plurality of available game rules that each indicate how removal of a game icon from within the game boundary will cause remaining game icons to be reconfigured within the game boundary;

receive a first game input from the player, wherein the first game input is associated with a first game icon displayed within the game boundary;

remove a first set of icons that are at least adjacent to the first game icon, wherein the removal of the first set of icons defines a second set of icons that remain within the game boundary;

reconfigure at least a portion of the second set of game icons that remain within the game boundary, wherein the reconfiguration is based on the first game rule; and reveal, after receiving the first game input, a second game rule to the player, wherein the second game rule is selected randomly from the plurality of available game rules.

* * * * *